(12) United States Patent
Kobayashi

(10) Patent No.: US 10,569,337 B2
(45) Date of Patent: Feb. 25, 2020

(54) HOLDER FOR A CUTTING TOOL, CUTTING TOOL, AND METHOD OF MANUFACTURING MACHINED PRODUCT

(71) Applicant: KYOCERA CORPORATION, Kyoto-shi, Kyoto (JP)

(72) Inventor: Youji Kobayashi, Yasu (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 16/065,175

(22) PCT Filed: Dec. 21, 2016

(86) PCT No.: PCT/JP2016/088167
§ 371 (c)(1),
(2) Date: Jun. 22, 2018

(87) PCT Pub. No.: WO2017/110903
PCT Pub. Date: Jun. 29, 2017

(65) Prior Publication Data
US 2019/0015904 A1 Jan. 17, 2019

(30) Foreign Application Priority Data
Dec. 25, 2015 (JP) .................. 2015-253581

(51) Int. Cl.
*B23B 27/10* (2006.01)
*B23Q 11/10* (2006.01)

(52) U.S. Cl.
CPC .......... *B23B 27/10* (2013.01); *B23Q 11/1046* (2013.01)

(58) Field of Classification Search
CPC ....... B23B 27/10; B23B 27/1666; B23C 5/28; B23Q 11/10
See application file for complete search history.

(56) References Cited

U.S. PATENT DOCUMENTS 4,838,136 A * 6/1989 Kress ..................... B23B 29/16
407/11
6,471,448 B1 * 10/2002 Lagerberg ............ B23Q 11/005
407/11
(Continued)

FOREIGN PATENT DOCUMENTS

EP 1106287 A1 6/2001
JP H082511 A 1/1996
(Continued)

OTHER PUBLICATIONS

Heishin Dispenser, Toshutsu no Rashingaku Omo na Kanro Teiko to Keisanshiki, [Online], http://www.mohno-dispenserjp/compass/compass19.html, May 21, 2018 (retrieval date), 6 pages including English translation.
(Continued)

*Primary Examiner* — Alan Snyder
(74) *Attorney, Agent, or Firm* — Viering, Jentschura & Partner MBB

(57) ABSTRACT

A holder for a cutting tool of the present disclosure extends from a first end toward a second end, and includes an inflow port, an outflow port located at a side of the first end, and a flow path extending from the inflow port toward the outflow port. The outflow port includes a first opening and a second opening. The flow path includes a first flow path extending continuously from the inflow port, a second flow path extending continuously from the first flow path through a first branch port to the first opening, and a third flow path extending continuously from the first flow path through a second branch port to the second opening. The first branch port is larger than the second branch port. An outflow through the first opening is greater than an outflow through the second opening.

20 Claims, 15 Drawing Sheets

(56) References Cited

U.S. PATENT DOCUMENTS

| | | | | |
|---|---|---|---|---|
| 7,959,384 B2* | 6/2011 | Breisch | ................... | B23B 27/10 407/109 |
| 8,215,878 B2* | 7/2012 | Rozzi | ...................... | B23C 5/207 407/11 |
| 2002/0122698 A1* | 9/2002 | Lagerberg | ............... | B23B 27/10 407/11 |
| 2012/0230780 A1* | 9/2012 | Henry | ..................... | B23B 27/10 407/11 |
| 2014/0030033 A1* | 1/2014 | Luik | ....................... | B23B 27/10 407/11 |
| 2014/0133924 A1* | 5/2014 | Oren | ..................... | B23B 29/043 407/11 |
| 2014/0356082 A1* | 12/2014 | Smith | ..................... | B23B 27/10 407/11 |
| 2015/0132074 A1* | 5/2015 | Boissonnet | ........... | B23B 29/043 407/11 |
| 2016/0175938 A1* | 6/2016 | Kaufmann | .............. | B23B 27/10 407/11 |
| 2016/0339523 A1* | 11/2016 | Graf | ........................ | B23B 27/10 |
| 2017/0252839 A1* | 9/2017 | Donisi | ...................... | B23C 5/08 |
| 2018/0318935 A1* | 11/2018 | Kobayashi | .............. | B23B 27/10 |
| 2018/0326500 A1* | 11/2018 | Kaufmann | .............. | B23B 27/04 |

FOREIGN PATENT DOCUMENTS

| | | |
|---|---|---|
| JP | 2014231097 A | 12/2014 |
| WO | 0009280 A1 | 2/2000 |

OTHER PUBLICATIONS

Heishin Dispenser, Toshutsu no Rashingaku Toryo Bunki, [Online], http://www.mohno-dispenserjp/compass/compass20.html, May 21, 2018 (retrieval date), 5 pages including English translation.

* cited by examiner

HOLDER FOR A CUTTING TOOL, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2016/088167 filed on Dec. 21, 2016, which claims priority to Japanese Application No. 2015-253581 filed on Dec. 25, 2015, which are entirely incorporated herein by reference.

TECHNICAL FIELD

The present disclosure relates to a holder for a cutting tool used in a cutting process, such as a milling process or turning process, and also relates to a cutting tool and a method of manufacturing a machined product.

BACKGROUND

A turning tool as described in Patent Document 1 has been known as a cutting tool used in a cutting process of a workpiece, such as metals. The turning tool described in Patent Document 1 includes a flow path. The flow path is formed inside a tool body (holder) and branched on its way. A coolant is designed to be sprayingly supplied from two spray ports in branched flow paths toward an insert (cutting insert). The coolant is sprayed from one of the two spray ports toward a rake surface of the insert, and the coolant is sprayed from the other toward a flank surface of the insert. The turning tool in Patent Document 1 includes adjustment pieces respectively interposed in the branched flow paths. A flow rate of the coolant is adjusted by these adjustment pieces.

It is important to cool the rake surface when cooling the insert by using the coolant. The flow rate of the coolant is adjusted by these two adjustment pieces in the turning tool described in Patent Document 1. However, an operation to adjust the adjustment pieces is complicated. Adjustment positions of the adjustment pieces may be deviated due to, for example, vibration during the cutting process, resulting in insufficient cooling of the rake surface.

Patent Document 1: Japanese Unexamined Patent Publication No. 8-25111

SUMMARY

A holder for a cutting tool in the present disclosure extends from a first end toward a second end. The holder for a cutting tool includes an inflow port, an outflow port located at a side of the first end, and a flow path extending from the inflow port toward the outflow port. The outflow port includes a first opening and a second opening. The flow path includes a first flow path, a second flow path, and a third flow path. The first flow path extends continuously from the inflow port. The second flow path extends continuously from the first flow path through a first branch port to the first opening. The third flow path extends continuously from the first flow path through a second branch port to the second opening. The first branch port is larger than the second branch port. An outflow through the first opening is greater than an outflow through the second opening.

A cutting tool in the present disclosure includes a holder for the cutting tool in the above present disclosure, and a cutting insert. The cutting insert is designed to be attached to a side of the first end of the holder for the cutting tool. The cutting insert includes a first surface, a second surface, and a cutting edge located on an intersecting ridgeline of the first surface and the second surface.

A method of manufacturing a machined product in the present disclosure includes rotating a workpiece, bringing a cutting tool in the above present disclosure into contact with the workpiece being rotated, and moving the cutting tool away from the workpiece.

DETAILED DESCRIPTION

Figure 1:
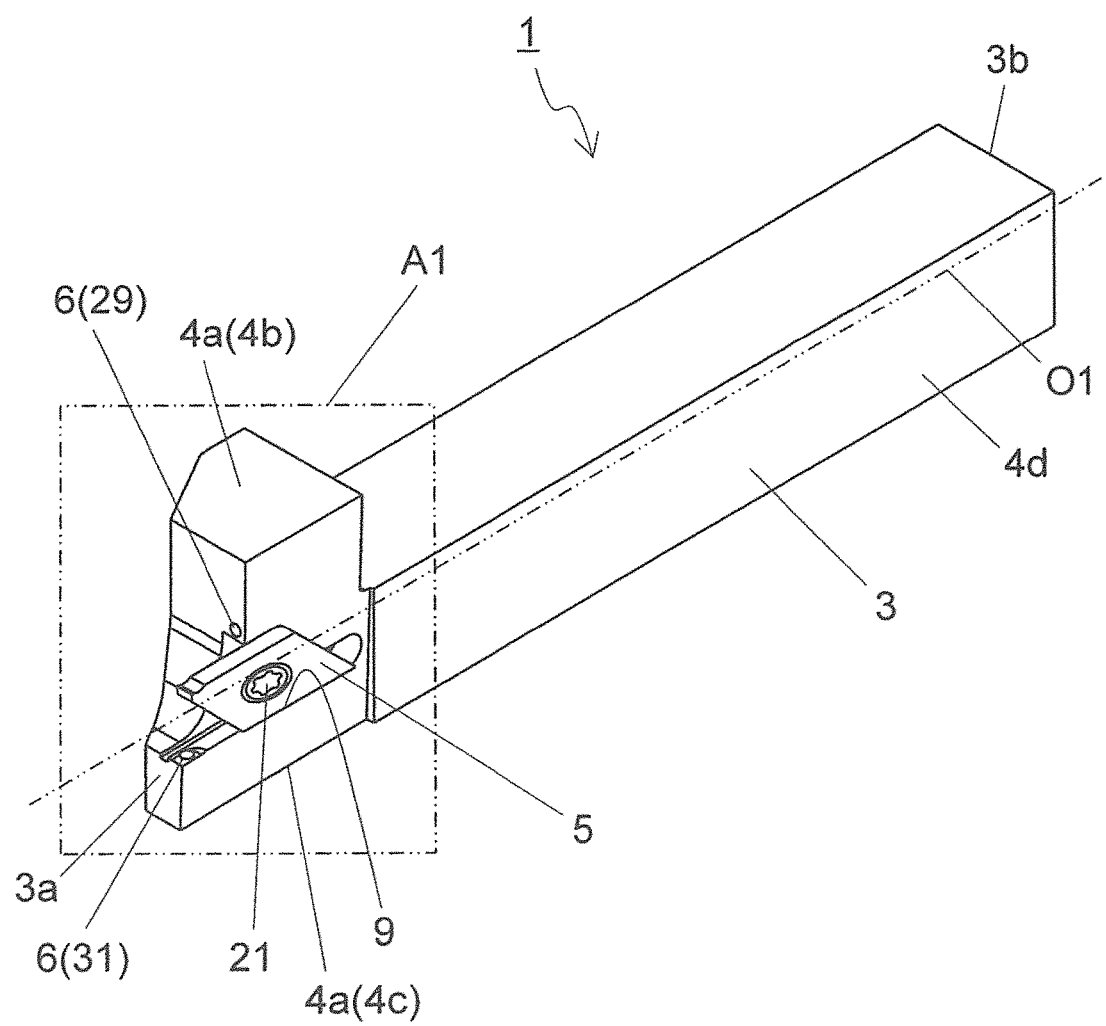
FIG. 1 is a perspective view illustrating a holder for a cutting tool and the cutting tool in a first embodiment of the present disclosure.

<Holder for a Cutting Tool and Cutting Tool>

Holders for a cutting tool and cutting tools in embodiments of the present disclosure are described in detail with reference to the drawings. For the sake of description, the drawings referred to in the following illustrate, in a simplified form, only main members necessary for describing the embodiments. The holders for the cutting tools and the cutting tools in the present disclosure are therefore capable of including any arbitrary structural member not illustrated in the drawings referred to. Sizes of the members in each of the drawings are not those which faithfully represent sizes of actual structural members and size ratios of these members. These are also true for a method of manufacturing a machined product described later.

First Embodiment

As illustrated in FIGS. 1 to 9, the cutting tool 1 of the present embodiment includes the cutting tool holder 3 (hereinafter also referred to as "holder 3") and a cutting insert 5 (hereinafter also referred to as "insert 5"). The holder 3 extends from a first end 3a toward a second end 3b. In other words, the holder 3 is a bar-shaped member extending from a side of the first end 3a, on which the insert 5 is located, toward a side of the second end 3b. The holder 3 of the present embodiment is a quadrangular prism-shaped member extending along a central axis O1 of the holder 3. The central axis O1 is indicated by a two-dot chain line in FIG. 1 and the like. The holder 3 includes a head 4a and a base member 4d which are located at a side of the first end 3a in the present embodiment. The central axis O1 is the central axis of the base member 4d. The head 4a is a segment designed to receive the insert 5 and includes an upper jaw 4b and a lower jaw 4c. The base member 4d is a segment that functions as a shank designed to fix the holder 3 to a machine tool.

For example, steel, cast iron, or aluminum alloy is usable as a material of the holder 3. Steel whose rigidity is higher among these materials is used in the cutting tool 1 of the present embodiment. A size of the holder 3 is suitably settable according to a size of a workpiece. For example, a length of the holder 3 in a direction along the central axis O1 is settable to 60-200 mm. A width of the holder 3 in a direction orthogonal to the central axis O1 is settable to 6-50 mm.

A pocket 9 is located at a side of the first end 3a of the holder 3. The cutting tool 1 illustrated in FIGS. 1 to 9 is an embodiment in which the holder 3 includes the single pocket 9. The pocket 9 is a region at which the insert 5 is located. The region is recessed at the side of the first end 3a of the holder 3 before attachment of the insert 5. The insert 5 is attached to the holder 3 so that a cutting edge 11 described later protrudes at a side of the first end 3a of the holder 3. The cutting tool 1 is designed to carry out the cutting process by the cutting edge 11. Although the holder 3 of the present embodiment includes the single pocket 9, there is no limit on the number of the pocket 9 of the holder 3. For example, the holder 3 may include a plurality of pockets 9. When provided with a plurality of pockets 9, a plurality of inserts 5 are attached to the holder 3.

Figure 2:
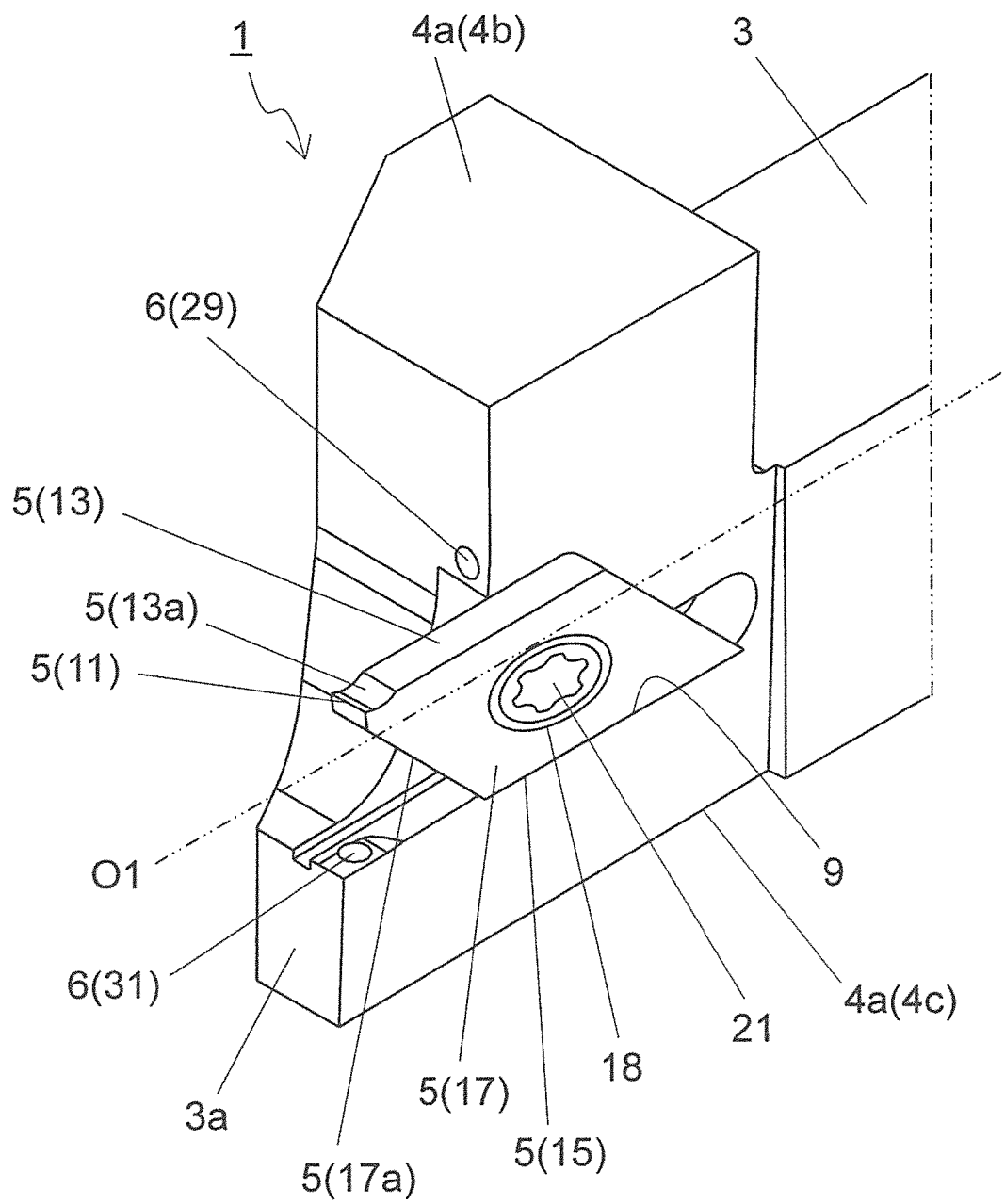
FIG. 2 is an enlarged view of a region A1 in FIG. 1.

The insert 5 is attached to the side of the first end 3a of the holder 3, and includes a first surface, a second surface, and the cutting edge 11 located on an intersecting ridgeline of the first surface and the second surface. More specifically, the insert 5 in the present embodiment includes an upper surface 13, a lower surface 15, a side surface 17, the cutting edge 11, and a through hole 18 as illustrated in FIG. 2. The upper surface 13 and the lower surface 15 have a polygonal shape, specifically a quadrangular shape in the present embodiment. The side surface 17 is a surface which is located between the upper surface 13 and the lower surface 15, and which connects to the upper surface 13 and the lower surface 15. The cutting edge 11 is located at least a part of a ridge where two surfaces of the insert 5 intersect with each other, specifically located at an intersection area of the upper surface 13 and a side surface 17a of the side surface 17. In other words, the upper surface 13 is a first surface, and the side surface 17a of the side surface 17 is a second surface in the present embodiment. The side surface 17a faces a side of the first end 3a when the insert 5 is attached to the holder 3. The cutting edge 11 is located on an intersecting ridgeline of the upper surface 13 and the side surface 17a. Alternatively, the cutting edge 11 may be located at a part or over an entirety of the intersecting ridgeline of the upper surface 13 and the side surface 17a.

The through hole 18 is located so as to extend between one side surface 17 and another side surface 17 located opposite thereto. The through hole 18 is a segment that permits insertion of a fixing member for fixing the insert 5 to the holder 3. The fixing member in the present embodiment is a screw 21. Instead of the screw 21, a clamp member or the like is usable for fixing the insert 5.

The insert 5 is being fixed to the holder 3 by using the screw 21 in the present embodiment illustrated in FIGS. 1 to 9. A screw hole (not illustrated) is disposed at a position in the pocket 9 of the holder 3 which corresponds to the though hole 18. The insert 5 is fixable to the pocket 9 by inserting the screw 21 into the through hole 18, and by screwing the screw 21 into the screw hole.

Figure 9:
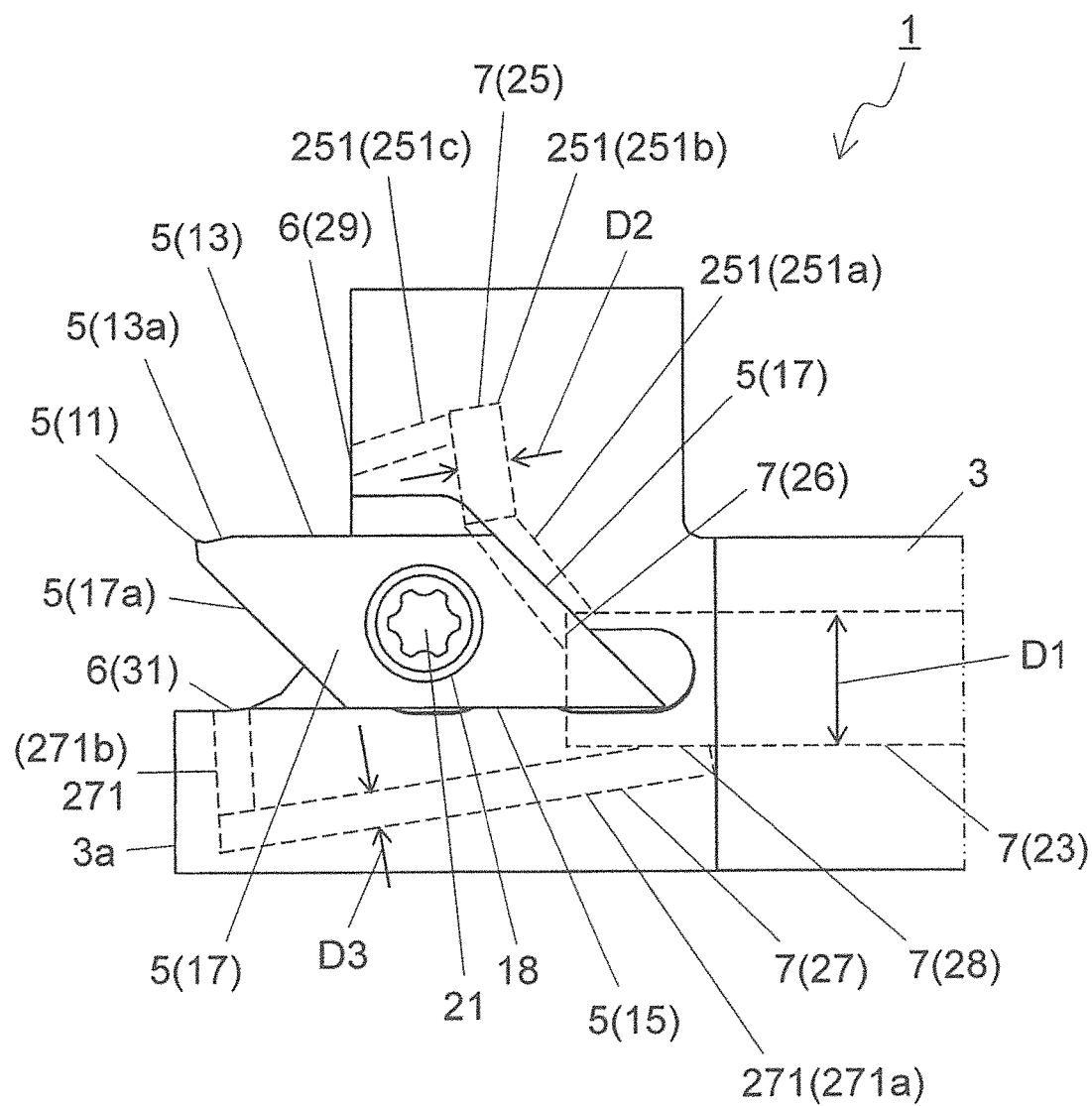
FIG. 9 is an enlarged view of a region A4 illustrated in FIG. 8.

The upper surface 13 in the insert 5 includes a so-called rake surface 13a that permits passage of chips generated by the cutting edge 11 during the cutting process. The rake surface 13a is a segment being partially recessed toward the lower surface 15 at a side of the first end 3a on the upper surface 13 in FIG. 9. At least a part of the side surface 17a located below the cutting edge 11 functions as a so-called flank surface as illustrated in FIG. 9.

For example, cemented carbide or cermet is usable as a material of the insert 5. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 5 may be coated with a coating film. Examples of a composition of the coating film include titanium carbide (TiC), titanium nitride (TiN), titanium carbonitride (TiCN), and alumina ($Al_2O_3$). As a method of depositing the coating film, it is possible to employ, for example, chemical vapor deposition (CVD) method or physical vapor deposition (PVD) method.

As illustrated in FIGS. 3, 4, 6, and 9, the holder 3 includes an inflow port 33, an outflow port 6 located at a side of the first end 3a, and a flow path 7 extending from the inflow port 33 toward the outflow port 6. Both of the inflow port 33 and the outflow port 6 open into a surface of the holder 3. The flow path 7 is located inside the holder 3. The inflow port 33, the outflow port 6, and the flow path 7 are designed to function as a segment that permits flow of a coolant (cooling fluid) for cooling the insert 5 during use of the cutting tool 1. In other words, the inflow port 33 is the segment into which the coolant is supplied from the outside. The flow path 7 is the segment that permits passage of the coolant supplied through the inflow port 33. The outflow port 6 is the segment through which the coolant after passing through the flow path 7 is sprayed.

The outflow port 6 includes a first opening 29 and a second opening 31. The first opening 29 opens toward the upper surface 13 that is the first surface, and the second opening 31 opens toward the side surface 17a that is the second surface in the present embodiment. The first opening 29 opens into the upper jaw 4b, and the second opening 31 opens into the lower jaw 4c (refer to FIG. 2). Positions into which the first opening 29 and the second opening 31 open are not limited to the above positions.

Figure 4:
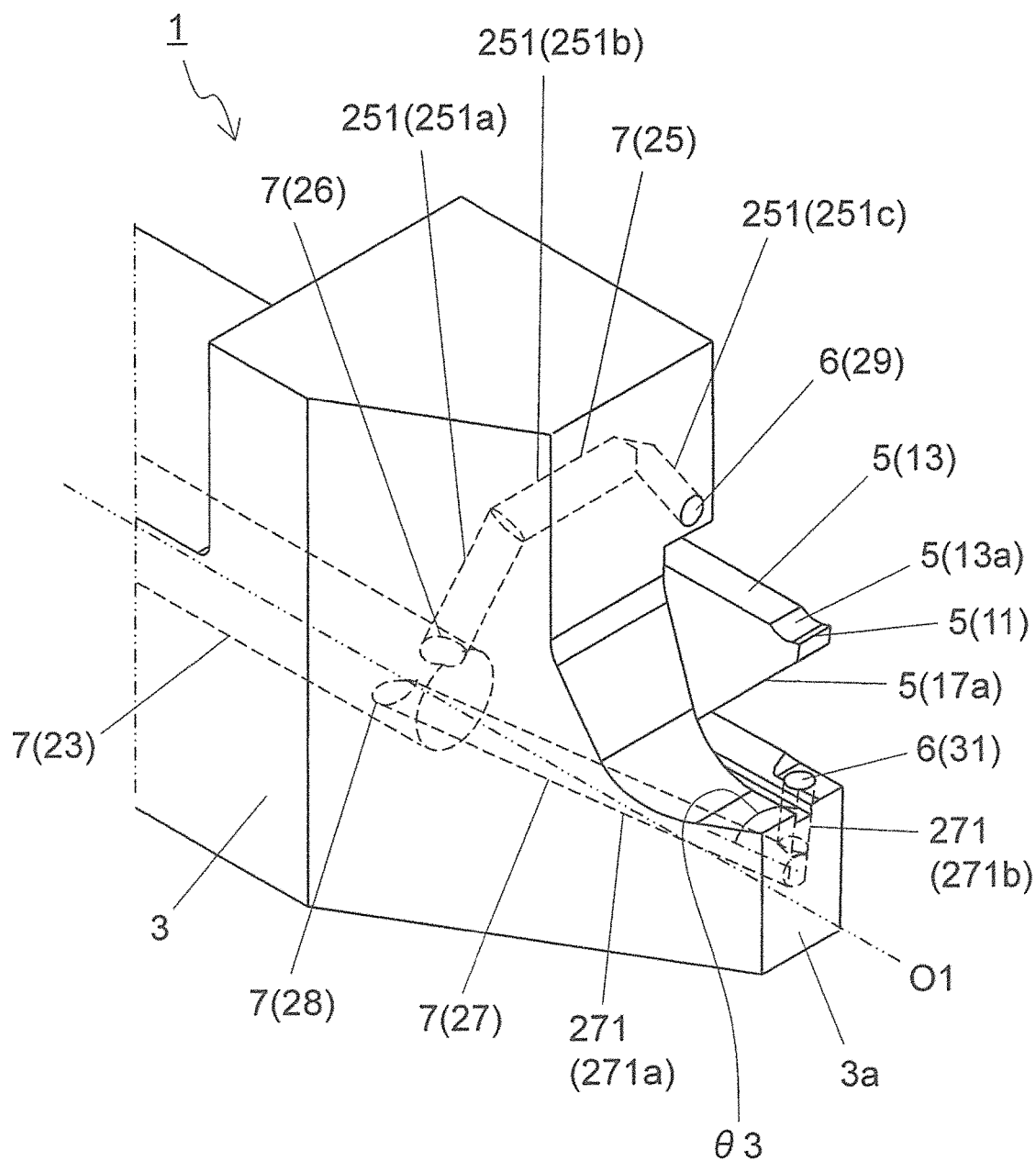
FIG. 4 is an enlarged view of a region A2 illustrated in FIG. 3.
Figure 5:
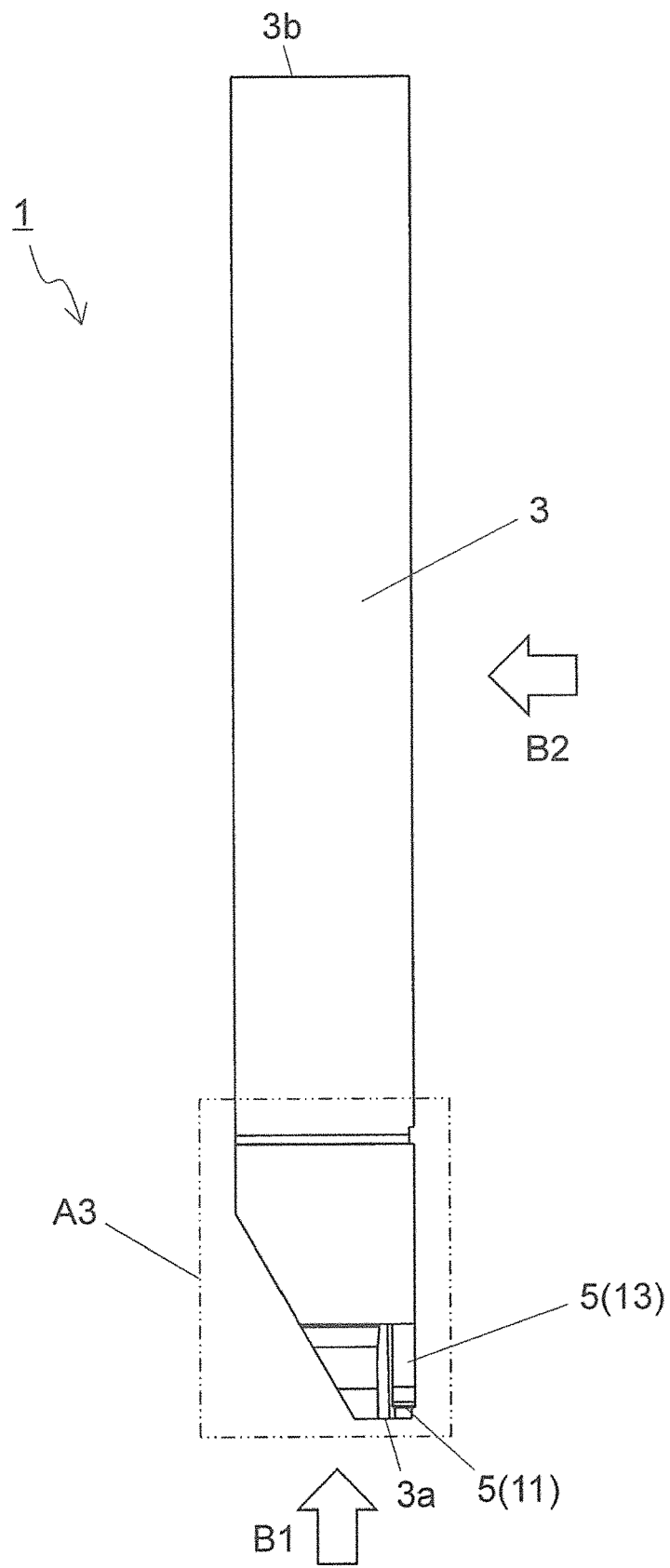
FIG. 5 is a top view of the holder for the cutting tool and the cutting tool illustrated in FIG. 1.
Figure 6:
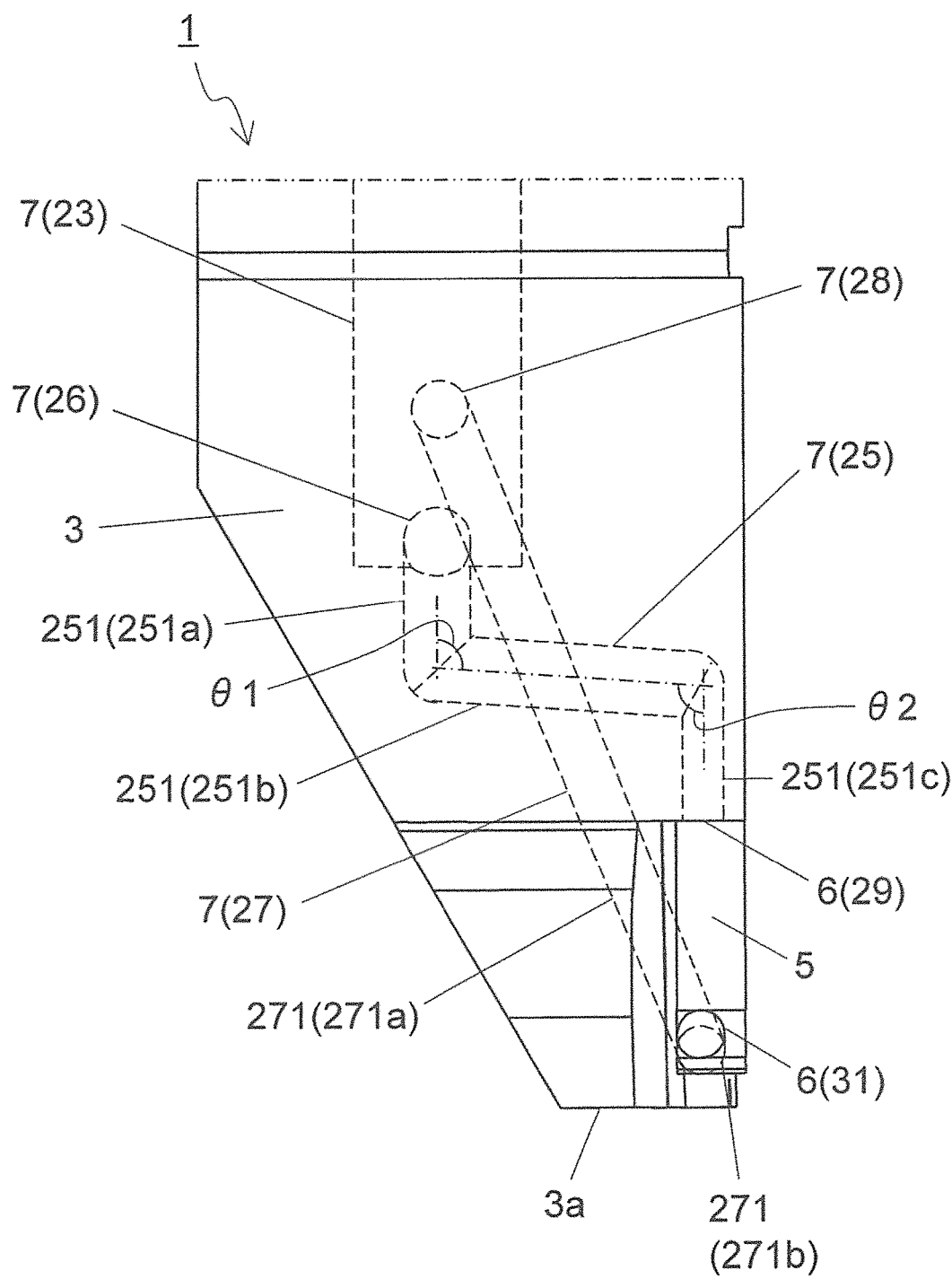
FIG. 6 is an enlarged view of a region A3 illustrated in FIG. 5.
Figure 7:
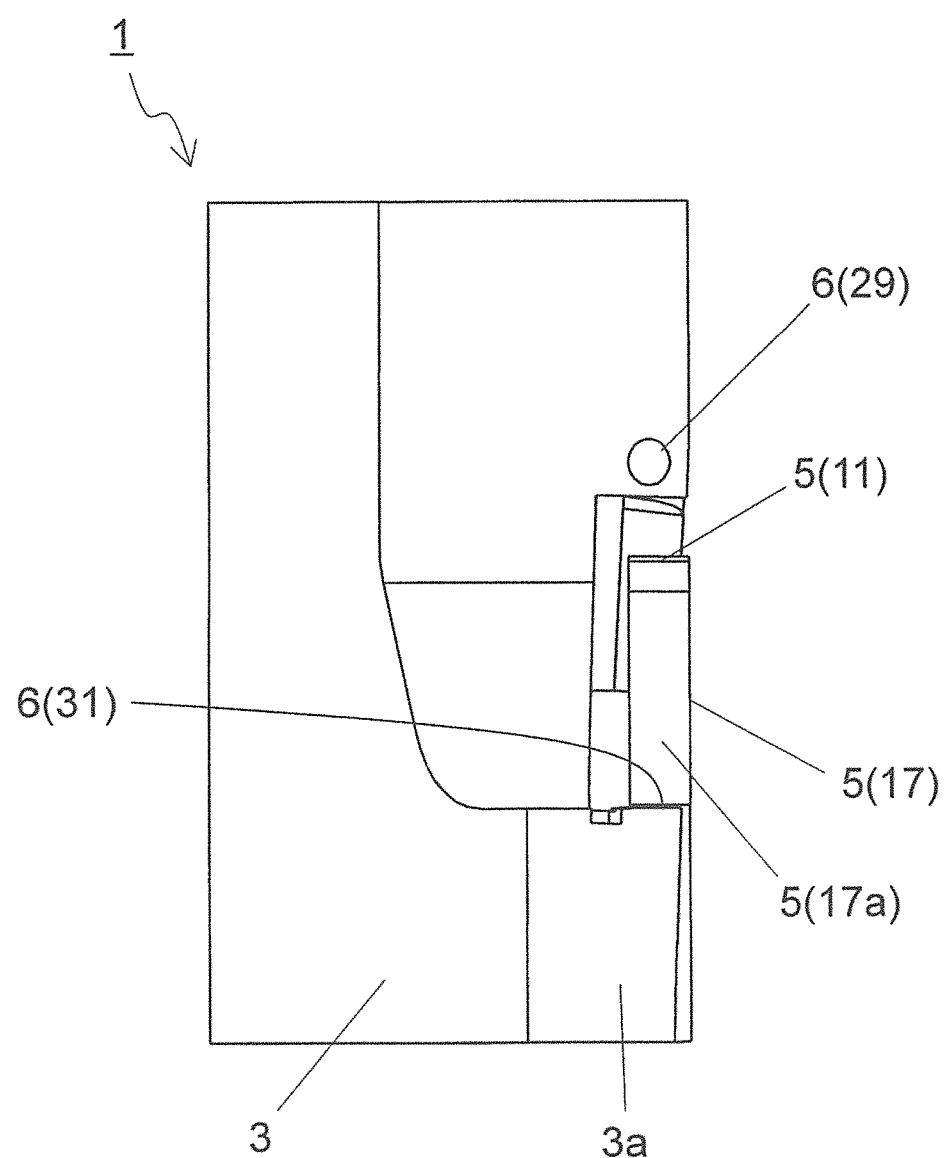
FIG. 7 is an enlarged side view when the holder for the cutting tool and the cutting tool illustrated in FIG. 5 are viewed from B1 direction.
Figure 8:
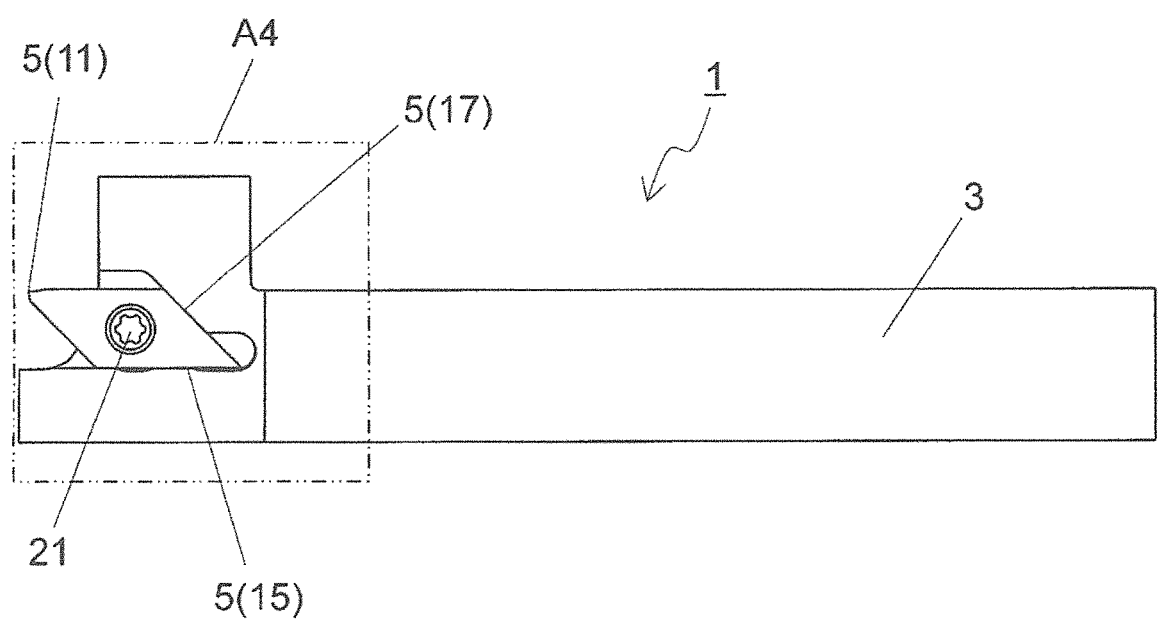
FIG. 8 is a side view when the holder for the cutting tool and the cutting tool illustrated in FIG. 5 are viewed from B2 direction.

The flow path 7 in the present embodiment includes a first flow path 23, a second flow path 25, and a third flow path 27 as illustrated in FIGS. 4, 6, and 9. The first flow path 23 extends continuously from the inflow port 33. The first flow path 23 in the present embodiment extends from a side of the second end 3b of the holder 3 toward a side of the first end 3a. Both of the second flow path 25 and the third flow path 27 connect to the first flow path 23. The second flow path 25 extends continuously from the first flow path 23 through a first branch port 26 to the first opening 29. Because the first opening 29 is located higher than the cutting edge 11 in the present embodiment, the second flow path 25 is raised upward from the first branch port 26. The third flow path 27 extends continuously from the first flow path 23 through a second branch port 28 to the second opening 31. Because the second opening 31 is located lower than the cutting edge 11 in the present embodiment, the third flow path 27 is located below the insert 5.

The outflow port 6 is the segment that permits outflow of the coolant toward the first surface or the second surface constituting the cutting edge 11. The first surface is the upper surface 13 including the rake surface 13a, and the second surface is the side surface 17a in the present embodiment. A part of the second flow path 25 which is located at a side of the first opening 29 may extend straight (in a straight line). When this configuration is satisfied, a flow direction of the coolant becomes stable, thus ensuring a stable outflow of the coolant from the first opening 29 toward the rake surface 13a of the upper surface 13. A part of the third flow path 27 which is located at a side of the second opening 31 may extend straight (in a straight line). When this configuration is satisfied, a flow direction of the coolant becomes stable, thus ensuring a stable outflow of the coolant from the second opening 31 toward a side of the cutting edge 11 on the side surface 17a. As illustrated in FIGS. 4, 6, and 9, a second sub flow path 251c described later corresponds to the part of the second flow path 25 which is located at the side of the first opening 29. A third sub flow path 271b described later corresponds to the part of the third flow path 27 which is located at the side of the second opening 31 in the present embodiment. Both of the second sub flow path 251c and the third sub flow path 271b extend in a straight line.

Figure 3:
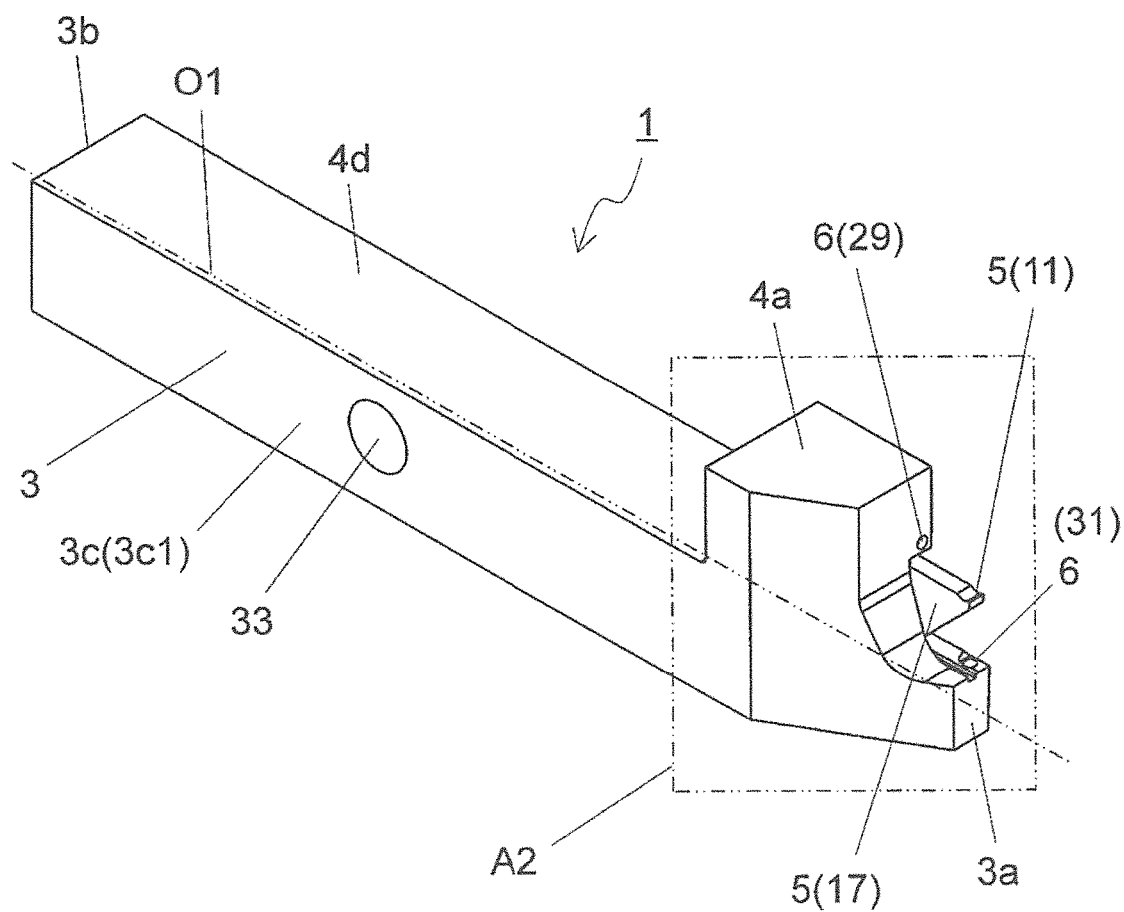
FIG. 3 is a perspective view when the holder for the cutting tool and the cutting tool illustrated in FIG. 1 are viewed from another direction.

The coolant is supplied from the inflow port 33 to the first flow path 23, and the coolant passes through the second flow path 25 and the third flow path 27, and is sprayed from the first opening 29 and the second opening 31 toward the vicinity of the cutting edge 11. In FIG. 3, the inflow port 33 is located at one side surface 3c1 of the side surface 3c of the holder 3. The position of the inflow port 33 is not limited to the above-mentioned position. For example, the inflow port 33 may be located at other side surface 3c of the holder 3 or an end surface at the side of the second end 3b. The number of the inflow port 33 needs to be at least one or alternatively may be two or more. The following description is given of the case where the number of the inflow port 33 is two. For example, one of the two inflow ports 33 may be located on one side surface 3c1 and the other may be located at the end surface at the side of the second end 3b. When this configuration is satisfied, the inflow port 33 to be used is selectable according to a coolant supply mechanism or machine tool. Here, the inflow port 33 not being selected may be closed by, for example, a detachable member.

Examples of the coolant include water insoluble oil agent and water soluble oil agent, which are suitably selected and used according to a material of a workpiece. Examples of the insoluble oil agent include oily, inert extreme pressure, and active extreme pressure cutting oils. Examples of the water soluble oil agent include emulsion, soluble, and solution type cutting oils.

During a cutting process of a workpiece for manufacturing a machined product, the coolant is sprayed in order to cool the insert 5 and remove chips. Here, the chips pass over the rake surface 13a of the insert 5, and it is therefore necessary to supply a larger amount of the coolant to a side of the upper surface 13 including the rake surface 13a than to a side of the side surface 17a in the insert 5 from viewpoints of cooling and chip removal.

The first branch port 26 is larger than the second branch port 28, and an outflow through the first opening 29 is greater than an outflow through the second opening 31 in the present embodiment. This makes it possible to supply the larger amount of the coolant to the side of the upper surface 13 than to the side of the side surface 17a in the insert 5. It is therefore possible to supply a large amount of the coolant to the rake surface 13a in the insert 5, thereby efficiently cooling the rake surface 13a. Consequently, cutting performance can be maintained without requiring any complicated operation. With this configuration, the cutting performance can be suitably maintained even in cases where the size of the holder 3 needs to be relatively reduced and it is difficult to design the flow path 7 so as to have a large length. Specifically, the cutting performance can be suitably maintained even when, for example, the holder 3 and the cutting tool 1 are applied to those for precision machining, such as automatic lathe.

Here, the phrase that the first branch port 26 is larger than the second branch port 28 denotes a state in which, for example, a cross-sectional area of the first branch port 26 is greater than a cross-sectional area of the second branch port 28. The cross-sectional area of the first branch port 26 may be evaluated by a cross-sectional area of an imaginary intersecting surface of the first flow path 23 and the second flow path 25. Similarly, the cross-sectional area of the second branch port 28 may be evaluated by a cross-sectional area of an imaginary intersecting surface of the first flow path 23 and the third flow path 27. The cross-sectional area of the first branch port 26 is, for example, 0.3-100 mm$^2$. The cross-sectional area of the second branch port 28 is, for example, 0.2-80 mm$^2$. Each of the first branch port 26 and the second branch port 28 has a circular shape on the imaginary intersecting surface (refer to FIG. 6). In such case, each of configurations of the first branch port 26 and the second branch port 28 may be evaluated in terms of, for example, inner diameter instead of cross-sectional area. If it is possible to cause the coolant to flow well, the shapes of the first branch port 26 and the second branch port 28 are not limited to the circular shape.

The outflow through the first opening 29 as described above denotes a volume of a fluid that flows from the first opening 29 per unit time. Similarly, the outflow through the second opening 31 denotes a volume of the fluid that flows from the second opening 31 per unit time.

When the first opening 29 and the second opening 31 have the same size, a cross-sectional area (inner diameter D2) of the second flow path 25 extending continuously from the first branch port 26 may be greater than a cross-sectional area (inner diameter D3) of the third flow path 27 extending continuously from the second branch port 28 as illustrated in FIG. 9. When this configuration is satisfied, pressure loss in the third flow path 27 becomes greater than pressure loss in the second flow path 25. Therefore, the outflow through the first opening 29 can be made greater than the outflow through the second opening 31. The cross-sectional area of the second flow path 25 is, for example, 0.3-100 mm$^2$. The cross-sectional area of the third flow path 27 is, for example, 0.2-80 mm$^2$.

A cross section orthogonal to the flow direction of the coolant in each of the second flow path 25 and the third flow path 27 has a circular shape in the present embodiment. In such a case, the configurations of the second flow path 25 and the third flow path 27 may be respectively evaluated by the inner diameters D2 and D3 instead of the cross-sectional area. This is also true for the first flow path 23. Specifically, the first flow path 23 has also a circular shape in a cross section orthogonal to the flow direction of the coolant in the present embodiment. The configuration of the first flow path 23 may be therefore evaluated by an inner diameter D1 thereof. If it is possible to cause the coolant to flow well, the cross-sectional shapes of the first flow path 23, the second flow path 25, and the third flow path 27 are not limited to the circular shape. When the flow path to be evaluated is made up of a plurality of flow paths, an evaluation may be carried out by an average value of the plurality of flow paths.

The second flow path 25 may be shorter than the third flow path 27. When this configuration is satisfied, pressure loss in the third flow path 27 becomes greater than pressure loss in the second flow path 25. It is therefore possible to supply a relatively large amount of the coolant to the upper surface 13 of the insert 5. A length of the second flow path 25 is, for example, 3-90 mm. A length of the third flow path 27 is, for example, 4-100 mm.

The first branch port 26 in the second flow path 25 may be located closer to a side of the first end 3a of the holder 3 than the second branch port 28 in the third flow path 27. In other words, the second flow path 25 may connect to the first flow path 23 at a side closer to the first end 3a of the holder 3 than the third flow path 27. Because the insert 5 is located at the side of the first end 3a of the holder 3, the length of the second flow path 25 can be reduced when the second flow path 25 is located as described above. This makes it possible to reduce pressure loss of the coolant in the second flow path 25. It is consequently possible to supply a relatively larger amount of the coolant to the upper surface 13 of the insert 5.

Alternatively, the cross-sectional area (inner diameter D1) of the first flow path 23 may be greater than the cross-sectional area (inner diameter D2) of the second flow path 25 as illustrated in FIG. 9. The first flow path 23 is the flow path designed to supply the coolant to the second flow path 25 and the third flow path 27. Thus, when the cross-sectional area (inner diameter D1) of the first flow path 23 is greater than the cross-sectional area (inner diameter D2) of the second flow path 25, a fluid pressure is less likely to become low when the coolant flows from the first flow path 23 to the second flow path 25. The cross-sectional area of the first flow path 23 is, for example, 0.3-120 mm$^2$.

Still alternatively, the cross-sectional area (inner diameter D1) of the first flow path 23 may be greater than the cross-sectional area (inner diameter D3) of the third flow path 27 as illustrated in FIG. 9. When the cross-sectional area (inner diameter D1) of the first flow path 23 is greater than the cross-sectional area (inner diameter D3) of the third flow path 27, the fluid pressure is less likely to become low when the coolant flows from the first flow path 23 to the third flow path 27 as in the case of the second flow path 25.

In evaluations of areas in the cross section orthogonal to the flow direction of the coolant in each of the first flow path 23, the second flow path 25, and the third flow path 27, the cross-sectional area of the first flow path 23 may be greater than a sum of the cross-sectional area of the second flow path 25 and the cross-sectional area of the third flow path 27. When this configuration is satisfied, the fluid pressure is much less likely to become low when the coolant flows from the first flow path 23 to the second flow path 25 and the third flow path 27.

The first opening 29 may be smaller than the first branch port 26. In other words, an area (inner diameter) of the first opening 29 may be smaller than a cross-sectional area (inner diameter) of the first branch port 26 in the second flow path 25. When this configuration is satisfied, it is possible to increase spraying speed of the coolant from the first opening 29. The area of the first opening 29 is, for example, 0.005-80 mm$^2$.

The first opening 29 has a circular shape in the present embodiment. In this case, the configuration of the first opening 29 may be evaluated by the inner diameter instead of the area. This is also true for the second opening 31. That is, because the second opening 31 also has a circular shape in the present embodiment, the configuration of the second opening 31 may be evaluated by the inner diameter instead of the area. If it is possible to cause the coolant to flow well, the first opening 29 and the second opening 31 may have, for example, an elliptical shape or V-shape without being limited to the circular shape. When both of the first opening 29 and the second opening 31 have the circular shape, unnecessary pressure loss in the openings is suitably reducible. The shape of the first opening 29 may be the same as or different from the shape of the second opening 31. For example, the pressure loss may differ between the openings by making the first opening 29 into the circular shape and by making the second opening 31 into the V-shape.

The first opening 29 may be smaller than the second opening 31. In other words, the area (inner diameter) of the first opening 29 may be smaller than the area (inner diameter) of the second opening 31. When this configuration is satisfied, it is easy to increase a spraying speed of the coolant sprayed from the first opening 29 toward the upper surface 13 of the insert 5. Alternatively, the spraying speed of the coolant from the first opening 29 may be increased by making the cross-sectional area (inner diameter D2) of the second flow path 25 larger than the cross-sectional area (inner diameter D3) of the third flow path 27, and by making the first opening 29 smaller to such an extent that the flow rate of the coolant does not become extremely low. The area of the second opening 31 is, for example, 0.005-80 mm$^2$.

In cases where the second flow path 25 and the third flow path 27 have a corner part, both may have a corner part having an obtuse angle without having a corner part having such an acute angle that causes an increase in pressure loss. In other words, when each of the second flow path 25 and the third flow path 27 is made up of a plurality of flow paths, an angle formed by two adjacent flow paths may be an obtuse angle instead of an acute angle. The outflow through the first opening 29 and the outflow through the second opening 31 may be controlled by making the corner parts in the third flow path 27 have a right angle or acute angle. Specifically, when the third flow path 27 is made up of a plurality of flow paths, the outflow through the first opening 29 and the outflow through the second opening 31 may be controlled by designing so that the angle formed by the two adjacent flow paths is a right angle or acute angle. Alternatively, the spraying speed from the second opening 31 may be increased within a range of a magnitude relationship between the first opening 29 and the second opening 31.

When a central axis of one of the two adjacent flow paths intersects with a central axis of the other, the angle formed by the two adjacent flow paths may be evaluated by an angle formed by these central axes. In cases where the central axis of one of the two adjacent flow paths does not intersect with the central axis of the other due to a connection state of the flow paths, the evaluation may be carried out by causing the central axis of one flow path to move in parallel until intersecting with the central axis of the other flow path so as to establish an intersecting state of these central axes. The central axis of each of the flow paths is obtainable by continuously extending the center of the cross-sectional area (inner diameter) of the flow path.

As illustrated in FIGS. 4, 6, and 9, the second flow path 25 includes second sub flow paths 251a, 251b, and 251c which are continuously located in this order from a side of the first flow path 23 in the present embodiment. The third flow path 27 includes third sub flow paths 271a and 271b which are continuously located in this order from a side of the first flow path 23. As illustrated in FIG. 6, an angle θ1 formed by the second sub flow paths 251a and 251b is an obtuse angle, and an angle θ2 formed by the second sub flow paths 251b and 251c is an obtuse angle. As illustrated in FIG. 4, an angle θ3 formed by the third sub flow paths 271a and 271b is a right angle (90°). The angle θ1 is, for example, 90-160°. The angle θ2 is, for example, 90-160°. The angle θ3 is, for example, 10-90°.

The flow path 7 is formable, for example, by carrying out a drilling process of a member that becomes the holder 3 by using a drill or the like. That is, the configuration of the flow path 7 in the present embodiment is obtainable without requiring any advanced machining process, thus reducing manufacturing costs of the holder 3. A part of a hole formed by the drilling process which does not function as the flow path 7 needs to be closed with a seal member (not illustrated) in order to avoid leakage of the coolant. Examples of the seal member include solder, resin members, and screw members.

Second Embodiment

A holder 43 for a cutting tool (hereinafter also referred to as "holder 43") and the cutting tool 41 in a second embodiment of the present disclosure are described in detail below with reference to FIG. 10. The following description is focused on members different from those in the first embodiment. Therefore, descriptions of members having configurations similar to those in the first embodiment are omitted by applying the corresponding descriptions in the first embodiment. This is also true for third and fourth embodiments described later.

Figure 10:
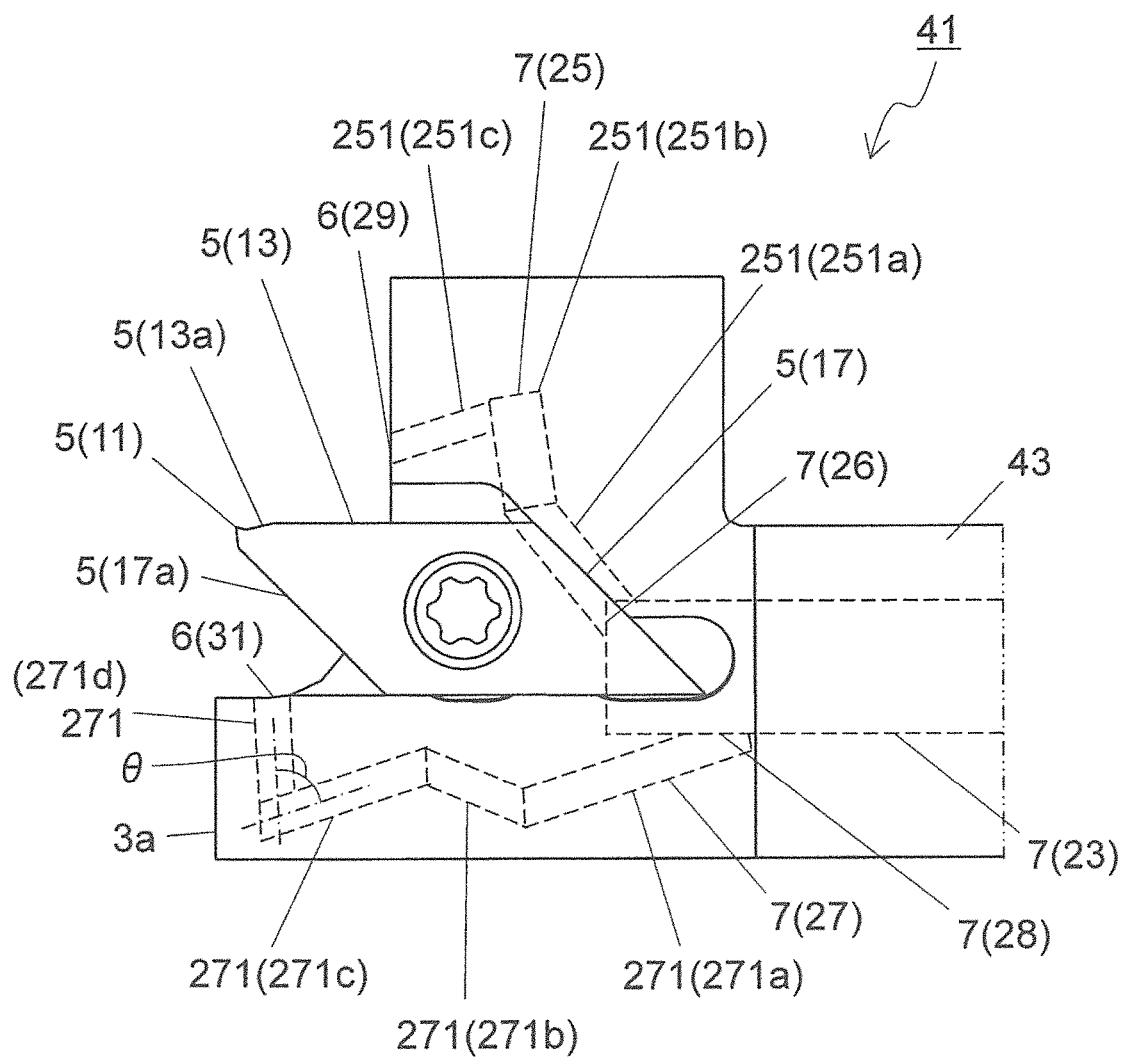
FIG. 10 is a diagram which illustrates a holder for a cutting tool and the cutting tool in a second embodiment of the present disclosure, and which corresponds to FIG. 9 in the first embodiment.

In the holder 43 included in the cutting tool 41 in the present embodiment, the second flow path 25 may include a plurality of second sub flow paths 251 as illustrated in FIG. 10. The third flow path 27 may also include a plurality of third sub flow paths 271. Here, the number of the second sub flow paths 251 may be smaller than the number of the third sub flow paths 271. When these configurations are satisfied, pressure loss in the third flow path 27 becomes greater than pressure loss in the second flow path 25. It is therefore possible to supply a relatively greater amount of a coolant to the upper surface 13 of the insert 5. This leads to efficient cooling of the rake surface 13a, thereby maintaining cutting performance without any complicated operation.

The number of the second sub flow paths 251 is, for example, 2 to 5. The number of the third sub flow paths 271 is, for example, 3 to 10. The second sub flow path 251 is made up of three second sub flow paths 251a, 251b, and 251c which are continuously located in this order from the side of the first flow path 23, and the third sub flow path 271 is made up of four third sub flow paths 271a, 271b, 271c, and 271d which are continuously located in this order from the side of the first flow path 23 in the present embodiment. The second sub flow paths 251 and the third sub flow paths 271 are not limited to a combination of the second sub flow paths 251a to 251c and the third sub flow paths 271a to 271d.

An angle formed by two adjacent third sub flow paths 271 of the plurality of third sub flow paths 271 may be an acute angle. When this configuration is satisfied, it is possible to increase pressure loss in the third flow path 27. An angle θ formed by the third sub flow paths 271c and 271d is an acute angle in the present embodiment. The angle θ is, for example, 10-90°. The third sub flow paths 271 of the plurality of third sub flow paths 271 which constitute the acute angle are not limited to the third sub flow paths 271c and 271d.

Third Embodiment

Figure 11:
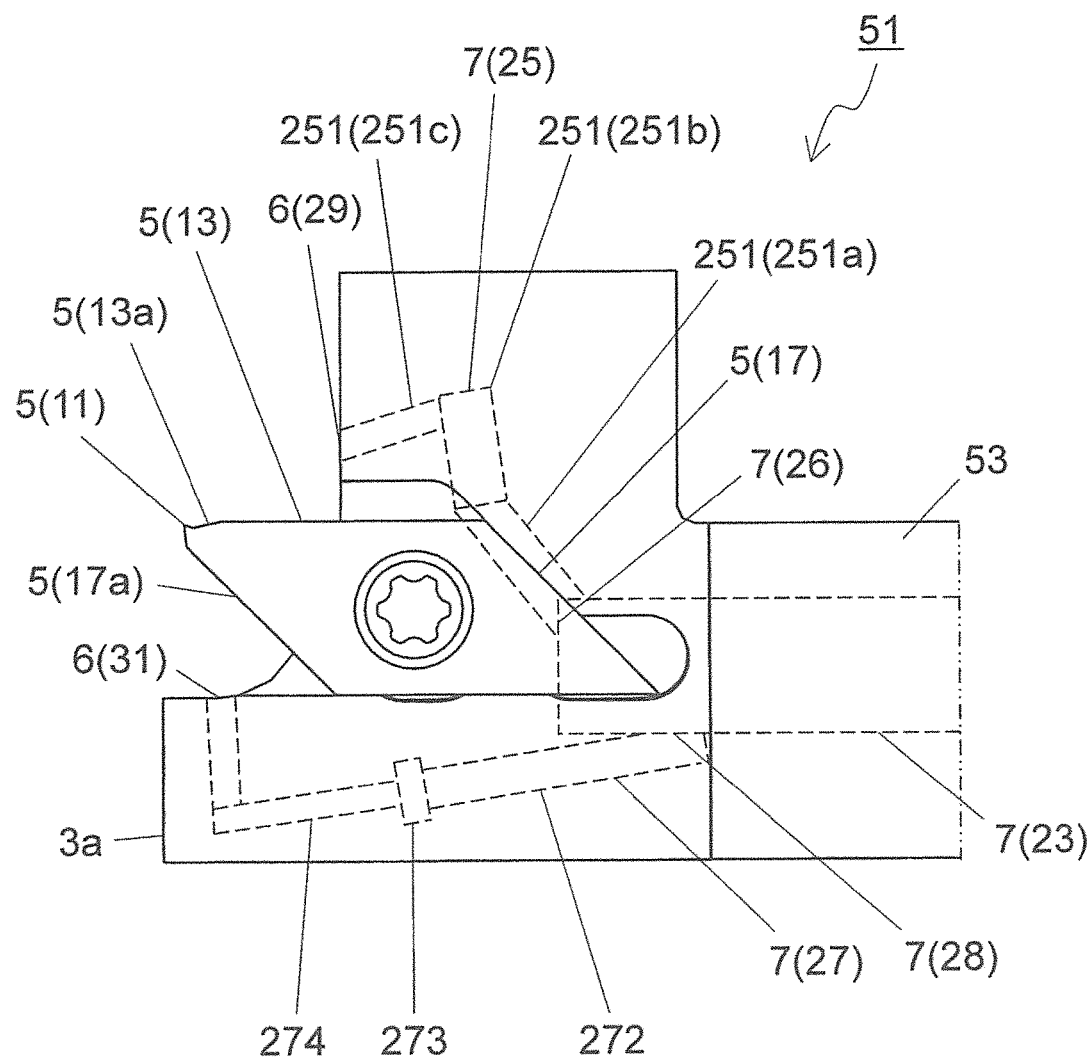
FIG. 11 is a diagram which illustrates a holder for a cutting tool and the cutting tool in a third embodiment of the present disclosure, and which corresponds to FIG. 9 in the first embodiment.

A holder 53 for a cutting tool (hereinafter also referred to as "holder 53") and the cutting tool 51 in a third embodiment of the present disclosure are described in detail below with reference to FIG. 11.

In the holder 53 included in the cutting tool 51 in the present embodiment, the third flow path 27 may include an upstream flow path 272, an intermediate flow path 273, and a downstream flow path 274 which are continuously located in this order from a side of the first flow path 23. Here, a cross-sectional area of the downstream flow path 274 may be equal to or smaller than a cross-sectional area of the upstream flow path 272, and a cross-sectional area of the intermediate flow path 273 may be greater than each of the cross-sectional area of the upstream flow path 272 and the cross-sectional area of the downstream flow path 274. When these configurations are satisfied, it is possible to increase pressure loss in the third flow path 27. Hence, a relatively greater amount of a coolant can be supplied to the upper surface 13 of the insert 5 by making the pressure loss in the third flow path 27 greater than pressure loss in the second flow path 25.

The cross-sectional area of the upstream flow path 272 is, for example, 0.2-80 mm². The cross-sectional area of the intermediate flow path 273 is, for example, 0.3-100 mm². The cross-sectional area of the downstream flow path 274 is, for example, 0.1-70 mm². The third flow path 27 may include a plurality of combinations of the upstream flow path 272, the intermediate flow path 273, and the downstream flow path 274.

Fourth Embodiment

A holder 63 for a cutting tool (hereinafter also referred to as "holder 63") and the cutting tool 61 in a fourth embodiment of the present disclosure are described in detail below with reference to FIG. 12.

Figure 12:
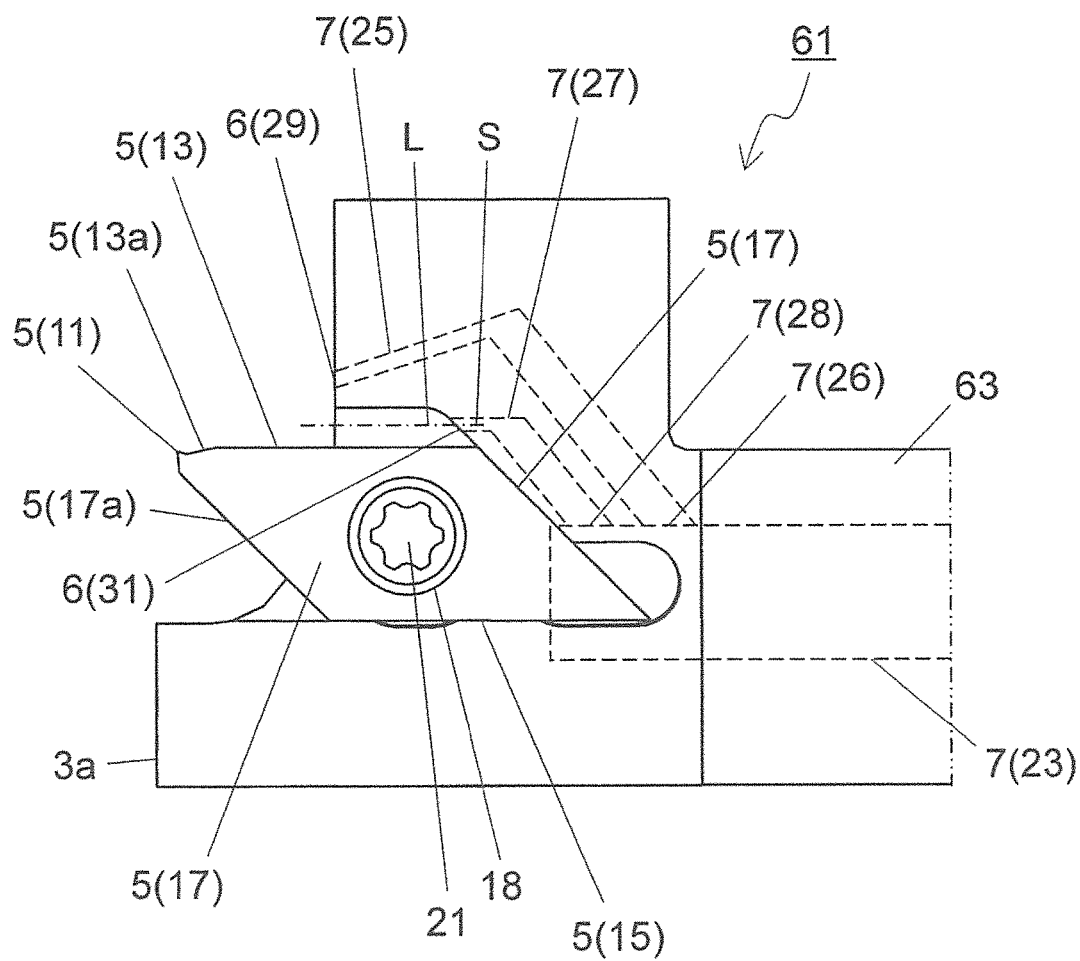
FIG. 12 is a diagram which illustrates a holder for a cutting tool and the cutting tool in a fourth embodiment of the present disclosure, and which corresponds to FIG. 9 in the first embodiment.

In the holder 63 included in the cutting tool 61 in the present embodiment, the first opening 29 may open toward the first surface (upper surface 13), and the second opening 31 may open along the first surface as illustrated in FIG. 12. When this configuration is satisfied, a coolant flowing out of the second opening 31 tends to be sprayed toward chips. Therefore, the rake surface 13a can be efficiently cooled by the coolant flowing out of the first opening 29 whose outflow is relatively large, while removing chips by the coolant flowing out of the second opening 31 whose outflow is relatively small. It is consequently possible to improve both chip discharge performance and cooling efficiency.

Here, the phrase that the second opening 31 opens along the first surface denotes a state in which the second opening 31 opens so that a line L obtained by extending the central axis S at the side of the second opening 31 of the third flow path 27 outwardly of the holder 63 follows the first surface.

<Method of Manufacturing Machined Product>

A method of manufacturing a machined product in an embodiment of the present disclosure is described below with reference to the drawings.

Figure 13:
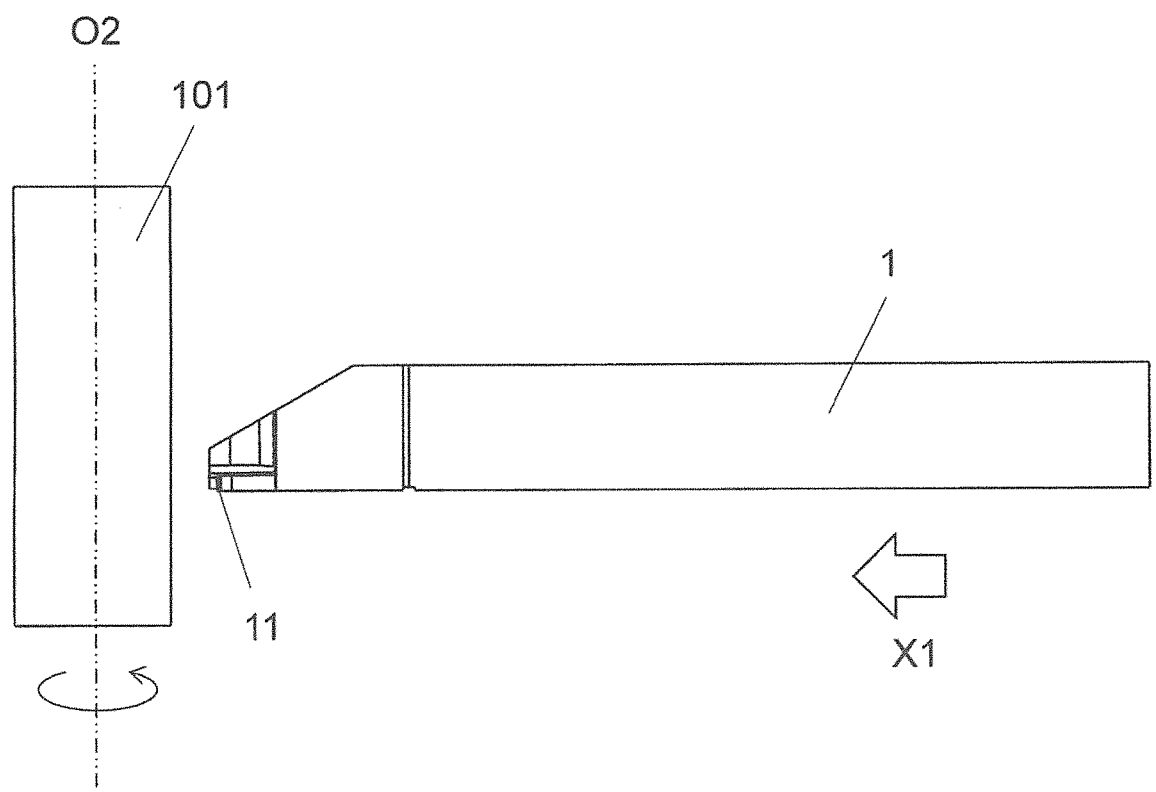
FIG. 13 is a schematic diagram illustrating a step in a method of manufacturing a machined product in an embodiment of the present disclosure.
Figure 14:
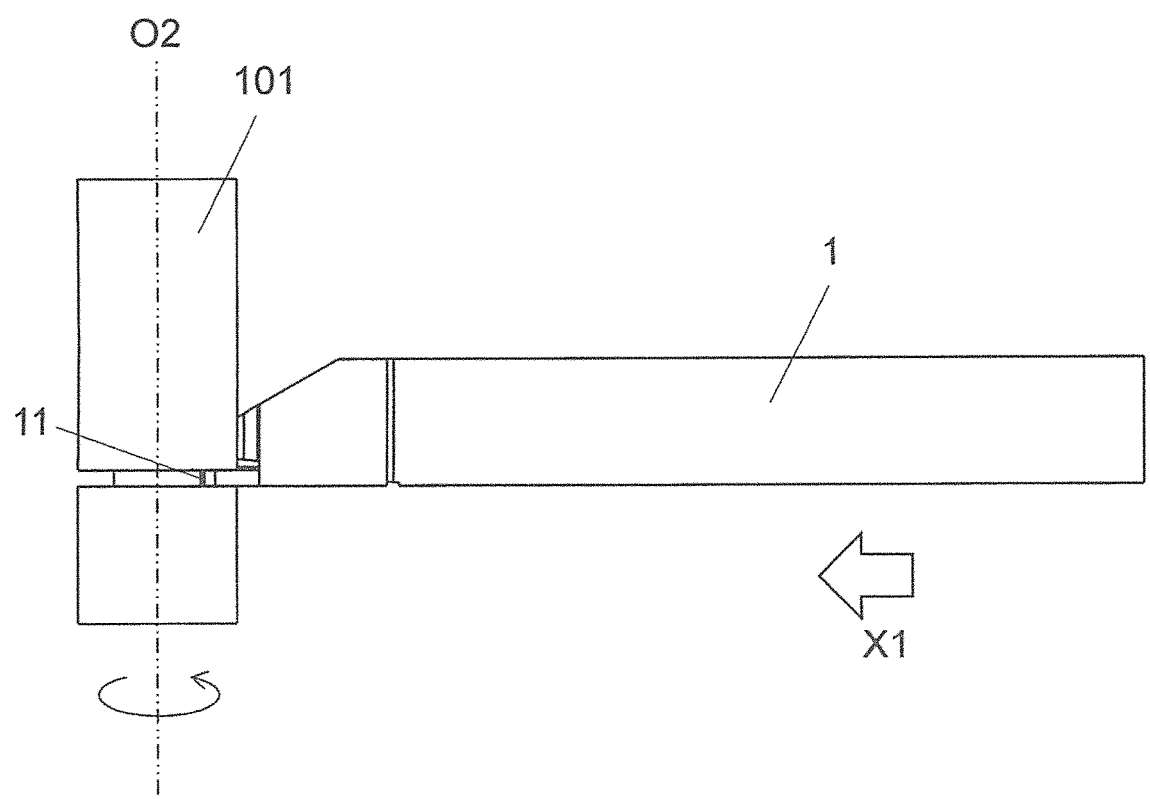
FIG. 14 is a schematic diagram illustrating a step in the method of manufacturing a machined product in the embodiment of the present disclosure.
Figure 15:
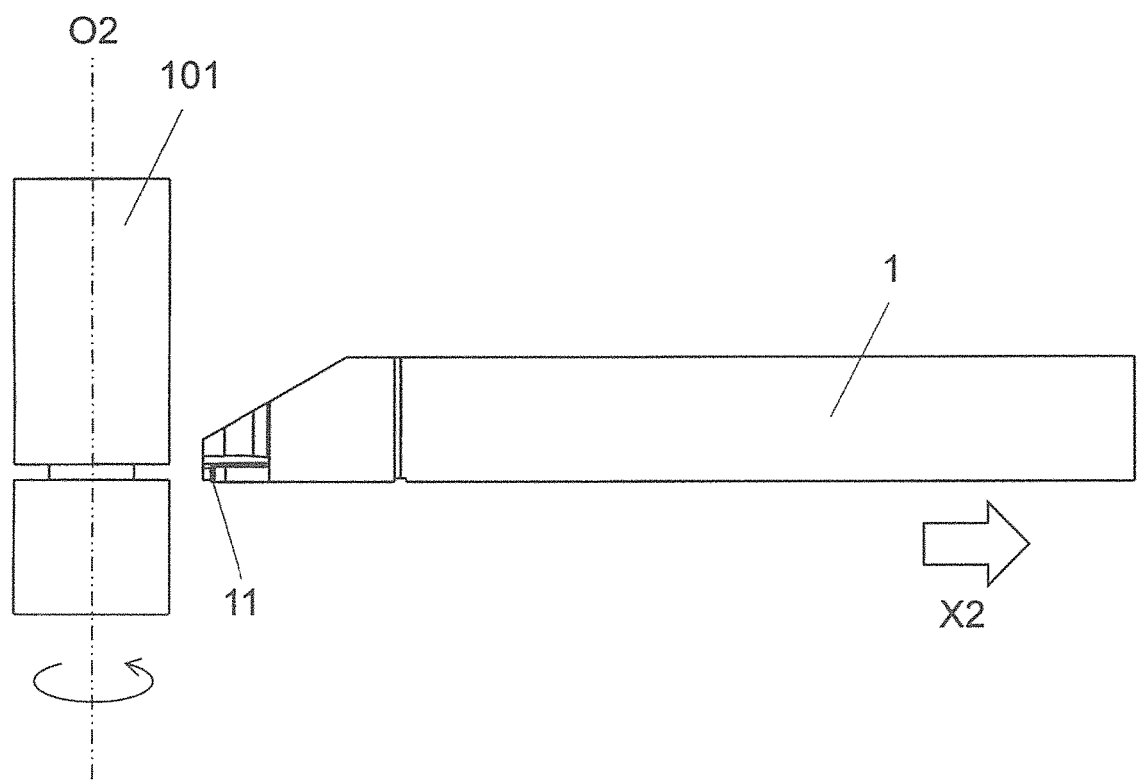
FIG. 15 is a schematic diagram illustrating a step in the method of manufacturing a machined product in the embodiment of the present disclosure.

The machined product is manufacturable by subjecting a workpiece 101 to a cutting process. As illustrated in FIGS. 13 to 15, the method of manufacturing the machined product in the present embodiment includes the following steps:

(1) rotating the workpiece 101;

(2) bringing the cutting tool 1 represented by the first embodiment into contact with the workpiece 101 being rotated; and (3) moving the cutting tool 1 away from the workpiece 101.

More specifically, firstly, the workpiece 101 is rotated around an axis O2, and the cutting tool 1 is brought relatively near the workpiece 101 while rotating the workpiece 101 around the rotation axis O2 as illustrated in FIG. 13. Subsequently, the workpiece 101 is cut out by bringing the cutting edge 11 in the cutting tool 1 into contact with the workpiece 101 being rotated as illustrated in FIG. 14. Here, the workpiece 101 may be cut out by allowing the coolant to flow out of each of the first opening 29 and the second opening 31. Thereafter, the cutting tool 1 is relatively moved away from the workpiece 101 as illustrated in FIG. 15.

With the method of manufacturing a machined product in the present embodiment, the cutting process can be carried out while efficiently cooling the rake surface 13a without requiring any complicated operation because the method uses the cutting tool 1 provided with the holder 3. It is consequently possible to efficiently obtain the machined product having a highly accurate machined surface.

In the present embodiment, the cutting tool 1 is brought near the workpiece 101 by moving the cutting tool 1 in X1 direction in a state in which the axis O2 is fixed and the workpiece 101 is rotated as illustrated in FIG. 13. In FIG. 14, the workpiece 101 is cut out by bringing the cutting edge 11 in the insert 5 into contact with the workpiece 101 being rotated. In FIG. 15, the cutting tool 1 is moved away from the workpiece 101 by moving the cutting tool 1 in X2 direction in a state in which the workpiece 101 is rotated.

The cutting tool 1 is brought into contact with workpiece 101, or the cutting tool 1 is moved away from the workpiece 101 by moving the cutting tool 1 in each of the steps in the present embodiment. It is, of course, not intended to limit to this embodiment.

For example, in the step (1), the workpiece 101 may be brought near the cutting tool 1. Similarly, in the step (3), the workpiece 101 may be moved away from the cutting tool 1. When the cutting process is continued, it is necessary to repeat the step of bringing the cutting edge 11 in the insert 5 into contact with different portions of the workpiece 101, while keeping the workpiece 101 rotated. Although the present embodiment has described the case of using the cutting tool 1 of the first embodiment, the cutting tool 41, 51, and 61 in the second to fourth embodiments may be used instead of the cutting tool 1.

Examples of the material of the workpiece 101 include carbon steel, alloy steel, stainless steel, cast iron, and nonferrous metals.

While the embodiments in the present disclosure have been described and illustrated above, the present disclosure is not limited thereto. It is, of course, possible to make any arbitrary ones insofar as they do not depart from the gist of the present disclosure.

DESCRIPTION OF REFERENCE NUMERALS 1 cutting tool
3 holder for a cutting tool
3a first end
3b second end
3c side surface
3c1 one side surface
4a head
4b upper jaw
4c lower jaw
4d base member
5 cutting insert
6 outflow port
7 flow path
9 pocket
11 cutting edge
13 upper surface
13a rake surface
15 lower surface
17 side surface
17a side surface
18 through hole
21 screw
23 first flow path
25 second flow path
251 second sub flow path
251a second sub flow path
251b second sub flow path
251c second sub flow path
26 first branch port
27 third flow path
271 third sub flow path
271a third sub flow path
271b third sub flow path
271c third sub flow path
271d third sub flow path
272 upstream flow path
273 intermediate flow path
274 downstream flow path
28 second branch port
29 first opening
31 second opening
33 inflow port
41 cutting tool
43 holder for a cutting tool
51 cutting tool
53 holder for a cutting tool
61 cutting tool
63 holder for a cutting tool
101 workpiece

The invention claimed is:

1. A holder for a cutting tool extending from a first end toward a second end, and comprising:
an inflow port;
an outflow port located at a side of the first end; and
a flow path extending from the inflow port toward the outflow port, wherein
the outflow port comprises a first opening and a second opening,
the flow path comprises a first flow path extending continuously from the inflow port, a second flow path extending continuously from the first flow path through a first branch port to the first opening, and a third flow path extending continuously from the first flow path through a second branch port to the second opening,
the first branch port is larger than the second branch port,
the second flow path comprises a plurality of second sub flow paths, and the third flow path comprises a plurality of third sub flow paths, and
a number of the plurality of second sub flow paths is smaller than a number of the plurality of third sub flow paths.

2. The holder for a cutting tool according to claim 1, wherein
the second flow path is shorter than the third flow path.

3. The holder for a cutting tool according to claim 2, wherein
the first branch port is located closer to a side of the first end than the second branch port.

4. The holder for a cutting tool according to claim 1, wherein
an angle formed by two adjacent third sub flow paths of the plurality of third sub flow paths is an acute angle.

5. The holder for a cutting tool according to claim 1, wherein
a cross-sectional area of the first flow path is greater than a cross-sectional area of the second flow path.

6. The holder for a cutting tool according to claim 1, wherein
the first opening is smaller than the first branch port.

7. The holder for a cutting tool according to claim 1, wherein
the first opening is smaller than the second opening.

8. The holder for a cutting tool according to claim 1, wherein
pressure loss in the third flow path is greater than pressure loss in the second flow path.

9. A cutting tool, comprising:
the holder for the cutting tool according to claim 1; and
a cutting insert which is designed to be attached to a side of the first end of the holder, and which comprises a first surface, a second surface, and a cutting edge located on an intersecting ridgeline of the first surface and the second surface.

10. The cutting tool according to claim 9, wherein
the first opening opens toward the first surface, and
the second opening opens toward the second surface.

11. The cutting tool according to claim 9, wherein
the first opening opens toward the first surface, and
the second opening opens along the first surface.

12. A method of manufacturing a machined product, comprising:
rotating a workpiece;
bringing the cutting tool according to claim 9 into contact with the workpiece being rotated; and
moving the cutting tool away from the workpiece.

13. A holder for a cutting tool extending from a first end toward a second end, and comprising:
an inflow port;
an outflow port located at a side of the first end; and
a flow path extending from the inflow port toward the outflow port, wherein
the outflow port comprises a first opening and a second opening,
the flow path comprises a first flow path extending continuously from the inflow port, a second flow path extending continuously from the first flow path through a first branch port to the first opening, and a third flow path extending continuously from the first flow path through a second branch port to the second opening,
the first branch port is larger than the second branch port,
the third flow path comprises an upstream flow path, an intermediate flow path, and a downstream flow path which are continuously located in this order from a side of the first flow path, and
a cross-sectional area of the downstream flow path is equal to or smaller than a cross-sectional area of the upstream flow path, and a cross-sectional area of the intermediately flow path is greater than each of the cross-sectional area of the upstream flow path and the cross-sectional area of the downstream flow path.

14. A cutting tool, comprising:
a holder extending from a first end toward a second end, and comprising:
an inflow port,
an outflow port located at a side of the first end, and
a flow path extending from the inflow port toward the outflow port; and
a cutting insert attached to a side of the first end of the holder, and comprising:
a first surface comprising a rake surface,
a second surface comprising a flank surface, and
a cutting edge located on an intersection of the first surface and the second surface;
wherein
the outflow port comprises:
a first opening that opens toward the first surface, and
a second opening that opens toward the second surface;
the flow path comprises:
a first flow path extending continuously from the inflow port,
a second flow path extending continuously from the first flow path through a first branch port to the first opening, and
a third flow path extending continuously from the first flow path through a second branch port to the second opening;
the first branch port is larger than the second branch port; and
the second flow path is shorter than the third flow path.

15. The cutting tool according to claim 14, wherein
the first branch port is located closer to a side of the first end than the second branch port.

16. The cutting tool according to claim 14, wherein
the second flow path comprises a plurality of second sub flow paths, and the third flow path comprises a plurality of third sub flow paths, and
a number of the plurality of second sub flow paths is smaller than a number of the plurality of third sub flow paths.

17. The cutting tool according to claim 16, wherein
an angle formed by two adjacent third sub flow paths of the plurality of third sub flow paths is an acute angle.
18. The cutting tool according to claim 14, wherein
the third flow path comprises an upstream flow path, an intermediate flow path, and a downstream flow path which are continuously located in this order from a side of the first flow path, and
a cross-sectional area of the downstream flow path is equal to or smaller than a cross-sectional area of the upstream flow path, and a cross-sectional area of the intermediately flow path is greater than each of the cross-sectional area of the upstream flow path and the cross-sectional area of the downstream flow path.
19. The cutting tool according to claim 14, wherein
a cross-sectional area of the first flow path is greater than a cross-sectional area of the second flow path.
20. The cutting tool according to claim 14, wherein
the first opening is smaller than the first branch port.

* * * * *